United States Patent
Kawasaki

(10) Patent No.: US 9,544,249 B2
(45) Date of Patent: Jan. 10, 2017

(54) APPARATUS AND METHOD FOR ALIGNING ORDER OF RECEIVED PACKETS

(71) Applicant: FUJITSU LIMITED, Kawasaki-shi, Kanagawa (JP)

(72) Inventor: Takeshi Kawasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 56 days.

(21) Appl. No.: 14/567,750

(22) Filed: Dec. 11, 2014

(65) Prior Publication Data
US 2015/0222570 A1  Aug. 6, 2015

(30) Foreign Application Priority Data
Feb. 5, 2014 (JP) ................ 2014-020580

(51) Int. Cl.
| | | |
|---|---|---|
| G01R 31/08 | (2006.01) | |
| G06F 11/00 | (2006.01) | |
| G08C 15/00 | (2006.01) | |
| H04L 12/861 | (2013.01) | |
| H04L 12/801 | (2013.01) | |
| H04L 12/807 | (2013.01) | |

(52) U.S. Cl.
CPC ......... H04L 49/9057 (2013.01); H04L 47/193 (2013.01); H04L 47/12 (2013.01); H04L 47/27 (2013.01)

(58) Field of Classification Search
CPC .................. H04L 45/25; H04L 49/9057
See application file for complete search history.

(56) References Cited

U.S. PATENT DOCUMENTS

| 6,757,255 B1 | 6/2004 | Aoki et al. | |
|---|---|---|---|
| 2007/0206600 A1* | 9/2007 | Klimker | H04L 12/2801 370/394 |
| 2009/0080334 A1 | 3/2009 | DeCusatis et al. | |
| 2012/0188873 A1* | 7/2012 | Nakatsugawa | H04L 1/0003 370/231 |

FOREIGN PATENT DOCUMENTS

| JP | 2000-106557 A | 4/2000 |
|---|---|---|
| JP | 2004-135065 A | 4/2004 |
| JP | 2009-239444 A | 10/2009 |
| JP | 2010-541351 A | 12/2010 |
| JP | 2011-135443 A | 7/2011 |
| JP | 2012-253618 A | 12/2012 |

* cited by examiner

Primary Examiner — Maharishi Khirodhar
(74) Attorney, Agent, or Firm — Arent Fox LLP

(57) ABSTRACT

An apparatus controls a communication in which packets to be transmitted over a transport layer connection established between a transmission side apparatus and a reception side apparatus are distributed to a plurality of links for transmission. The apparatus estimates a first transmission rate obtained by the communication in which an order alignment process is executed in a layer lower than the transport layer in the reception side apparatus, the order alignment process including aligning an order of received packets in accordance with a transmission order, and estimates a second transmission rate obtained by the communication in which the order alignment process is not executed. The apparatus controls an execution/non-execution of the order alignment process, based on a magnitude relationship between the first and second transmission rates.

6 Claims, 12 Drawing Sheets

FIG.11

| ADDRESS | OS IDENTIFICATION INFORMATION |
|---|---|
| xxxx | win |
| yyyy | linux |
| ⋮ | ⋮ |

FIG.12

| OS IDENTIFICATION INFORMATION | IDENTIFICATION INFORMATION OF CONGESTION CONTROL ALGORITHM |
|---|---|
| linux | B |
| win | A |
| unknown | - |

| DELAY DIFFERENCE x [ms] | OCCURRENCE PROBABILITY f(x) |
|---|---|
| 1 | f(1) |
| ... | ... |
| N | f(N) |

APPARATUS AND METHOD FOR ALIGNING ORDER OF RECEIVED PACKETS

CROSS-REFERENCE TO RELATED APPLICATION

This application is based upon and claims the benefit of priority from the prior Japanese Patent Application No. 2014-020580 filed on Feb. 5, 2014, the entire contents of which are incorporated herein by reference.

FIELD

The embodiments discussed herein are related to apparatus and method for aligning order of received packets.

BACKGROUND

In recent years, introduction of a link aggregation (LA) is under consideration as a technology for improving communication speed in a wireless communication. In the LA, packets to be transmitted over a transport layer connection (e.g., TCP (Transmission Control Protocol) connection) established between a transmission side apparatus and a reception side apparatus are classified and distributed to a plurality of links. That is, in the LA, communication with a total combined bandwidth of all links may be implemented. Further, as for a plurality of links (that is, a plurality of communication schemes) used in the LA, communication schemes in compliance with, for example, LTE (Long Term Evolution) communication standard and WiFi (registered trademark, Wireless Fidelity) communication standard may be considered. FIG. 1 is a diagram illustrating an example of a link aggregation.

When there exist differences in a propagation delay among a plurality of links used in the LA, order of packets arriving at the reception side apparatus may be different from the transmission order (hereinafter, may be referred to as, "out-of-ordering"). FIG. 2 is a diagram illustrating an example of an out-of-ordering of packets.

In a communication over the transport layer such as, for example, TCP, when an omission of a sequence number of the packet arrival order caused by the out-of-ordering is detected, the reception side apparatus transmits "Dup ACK (Duplicate Acknowledgement)" to the transmission side apparatus. That is, the Dup ACK is an ACK packet indicating that the omission of a sequence number of the packet arrival order has occurred. In the meantime, when more than a predetermined number of Dup ACKs are received, the transmission side apparatus determines that a packet loss has occurred at a location midway through a route from the transmission side apparatus to the reception side apparatus. The transmission side apparatus then performs a packet retransmission and, at the same time, decreases a transmission rate of packets. A "congestion window" is used for the control of the transmission rate.

However, when the frequency of receiving more than a predetermined number of the Dup ACKs increases, there is a possibility that the transmission rate is decreased abruptly.

In order to prevent an abrupt decrease of the transmission rate due to an abrupt reduction of the congestion window caused by the out-of-ordering, an "order alignment process" may be performed in a lower layer than the conventional transport layer (see, for example, FIG. 3). The order alignment process may be performed in, for example, an LA layer. For example, in a case where an out-of-ordering occurs in the LA layer, delivery of the received packet to the transport layer is suspended even when the packets transmitted later than the delayed packets have been already received. In the LA layer, the packets are delivered to the transport layer in accordance with the transmission order after the delayed packets have been received. That is, the order alignment process refers to a process in which the order of the received packets is aligned in accordance with the transmission order in the lower layer than the transport layer and the packets are then delivered to the transport layer in accordance with the transmission order. FIG. 3 is a diagram illustrating an example of an order alignment process.

A related technique is disclosed in, for example, Japanese Laid-Open Patent Publication No. 2009-239444.

In the meantime, the transport layer also has a functionality of aligning the order of packets.

That is, when the order alignment process is performed in the lower layer than the transport layer as described above, the order alignment process is performed in the lower layer separately from the order alignment process performed in the transport layer. Therefore, the consumption of the resources of the reception side apparatus such as, for example, a processor resource and a memory resource which temporarily maintains received packets, increases so that there is a possibility that a processing load of the reception side apparatus is increased.

SUMMARY

According to an aspect of the present disclosure, an apparatus controls a communication in which packets to be transmitted over a transport layer connection established between a transmission side apparatus and a reception side apparatus are distributed to a plurality of links for transmission. The apparatus estimates a first transmission rate obtained by the communication in which an order alignment process is executed in a layer lower than the transport layer in the reception side apparatus, the order alignment process including aligning an order of received packets in accordance with a transmission order, and estimates a second transmission rate obtained by the communication in which the order alignment process is not executed. The apparatus controls an execution/non-execution of the order alignment process, based on a magnitude relationship between the first and second transmission rates The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of an address/OS table, according to an embodiment;

FIG. 12 is a diagram illustrating an example of an OS/algorithm table, according to an embodiment;

DESCRIPTION OF EMBODIMENTS

Figure 1:
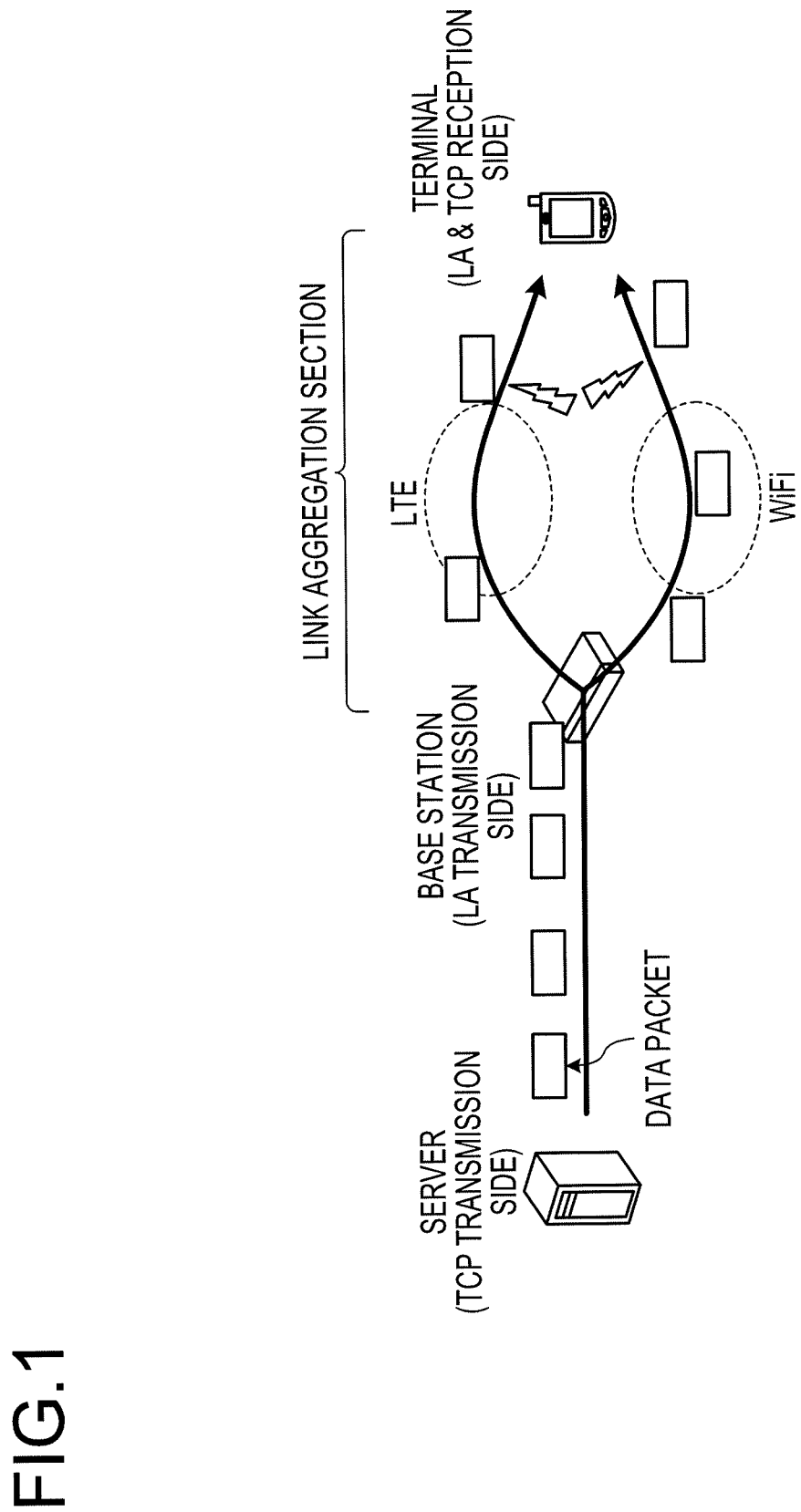
FIG. 1 is a diagram illustrating an example of a link aggregation.
Figure 2:
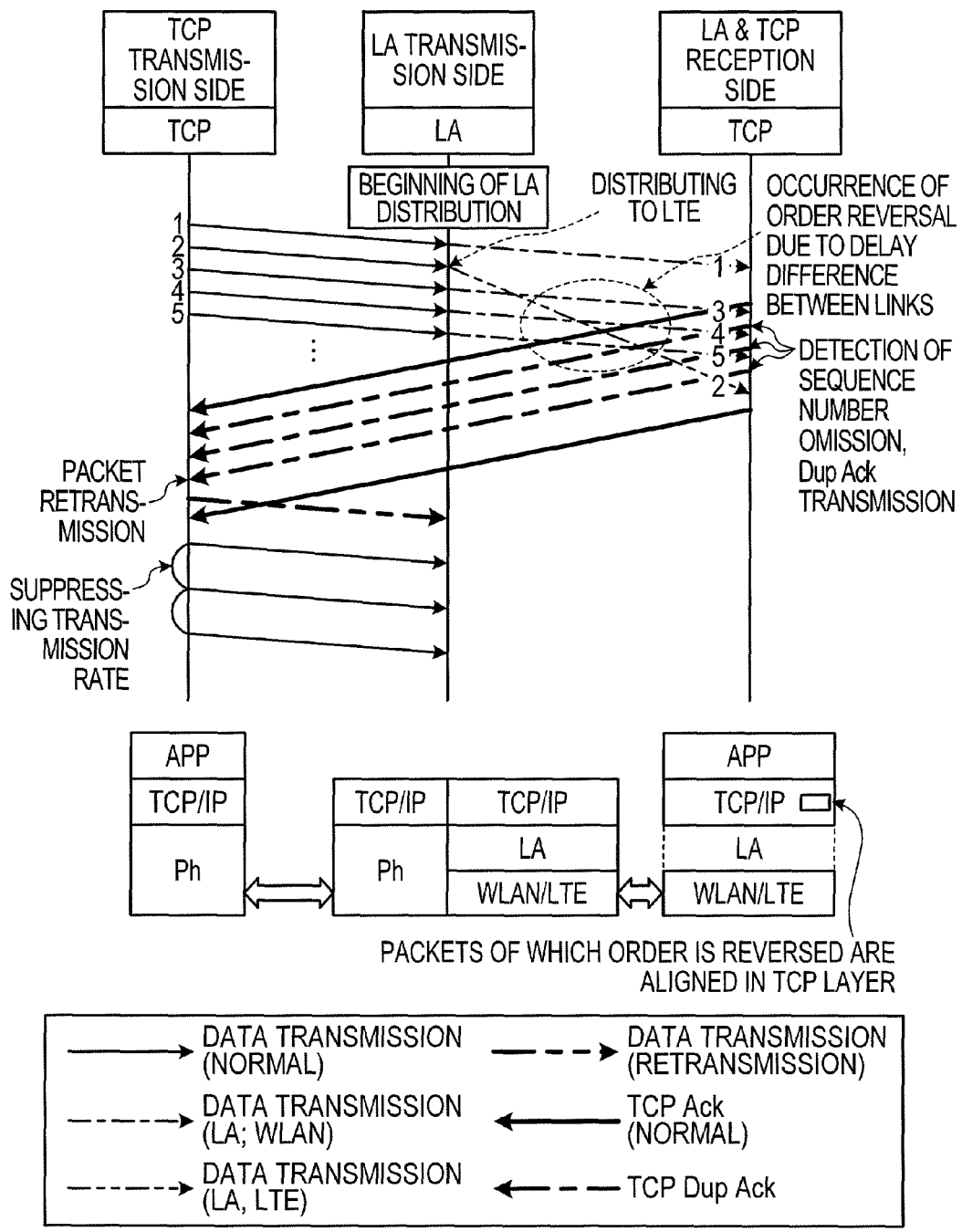
FIG. 2 is a diagram illustrating an example of an out-of-ordering of packets.

Hereinafter, descriptions will be made on embodiments of a control apparatus and a control method of the present disclosure based on the accompanying drawings in detail. Further, the control apparatus and the control method disclosed in the present disclosure are not limited to the embodiments. Further, the same constitutional elements in embodiments are assigned the same reference numerals and redundant descriptions thereof will be omitted.

Embodiment 1

Overview of Communication System

Figure 4:
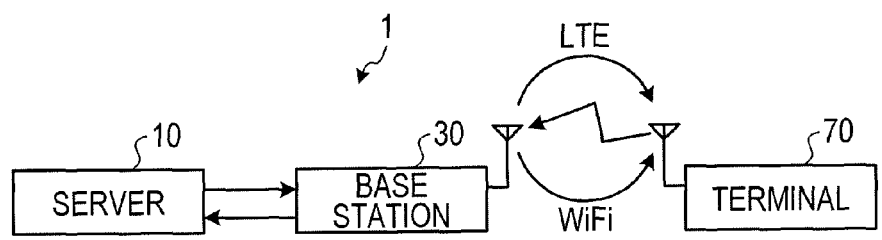
FIG. 4 is a diagram illustrating an example of a communication system, according to an embodiment.

FIG. 4 is a diagram illustrating an example of a communication system, according to an embodiment. Referring to FIG. 4, a communication system 1 includes a server 10, a base station 30, and a terminal 70. The server 10 is, for example, an application server. Further, the base station 30 is, for example, a femto-base station in compliant with an LTE communication standard. Here, descriptions will be made under the assumption that the packets are transmitted in a downstream link.

First of all, the connection of a transport layer is established between the server 10 and the terminal 70. Here, it is assumed that TCP is utilized as a protocol of the transport layer. Accordingly, the establishment of a TCP connection is implemented by, for example, a three-way handshaking sequence via the base station 30.

Subsequently, the server 10 transmits a group of packets addressed to the terminal 70 to the base station 30. Here, the server 10 controls, using the "congestion window", a transmission amount of packets to be transmitted before the arrival of the packets onto a reception side is acknowledged. Since a delivery confirmation as to whether the transmitted packet is delivered to the reception side is normally acknowledged by an acknowledgement (ACK) from the reception side within the round trip time (RTT), the "congestion window" corresponds to a transmission amount of packets to be transmitted within the RTT.

The base station 30 transmits a group of packets received from the server 10 to the terminal 70 by using the LA. That is, the base station 30 classifies the group of packets received from the server 10 into a plurality of links for transmission to the terminal 70. Here, it is assumed that first and second links used in the LA correspond to a link which is in compliant with the LTE communication standard (hereinafter, may also be referred to as "LTE link") and a link which is in compliant with the WiFi communication standard (hereinafter, may also be referred to as "WiFi link"), respectively.

Further, the base station 30 estimates a transmission rate (hereinafter, will also be referred to as "first transmission rate") obtained by the communication between the server 10 and the terminal 70 in a case where the "order alignment process" is executed in a layer (here, the LA layer) lower than the transport layer in the terminal 70 which is the reception side apparatus. Further, the base station 30 estimates a transmission rate (hereinafter, referred to as "second transmission rate") obtained by the communication between the server 10 and the terminal 70 in a case where the order alignment process described above is not executed. Also, the base station 30 controls the execution/non-execution of the order alignment process in the terminal 70 which is the reception side apparatus, based on a magnitude relationship between the estimated first transmission rate and the estimated second transmission rate. That is, here, it is assumed that the control apparatus which controls an LA communication is included in the base station 30.

For example, the base station 30 controls the execution/non-execution of the order alignment process so that the order alignment process is not executed in a case where a difference between the estimated first transmission rate and the estimated second transmission rate is less than a predetermined value, or the estimated second transmission rate is larger than the estimated first transmission rate. In the meantime, the base station 30 controls the execution/non-execution of the order alignment process so that the order alignment process is executed in a case where the estimated second transmission rate is less than the estimated first transmission rate and the difference is a predetermined value or more.

As described above, the terminal 70 which is the reception side apparatus does not always execute the order alignment process, and does not execute the order alignment process in a case where it is speculated that a large difference between the first and second transmission rates is not demonstrated regardless of whether the order alignment process is executed or not and in a case where the difference obtained when the order alignment process is not executed is larger than that obtained when the order alignment process is executed. Accordingly, a processing load of the terminal 70 which is the reception side apparatus may be reduced.

Further, as described above, when the out-of-ordering is detected, a Dup ACK is transmitted to the server 10 in the transport layer of the terminal 70.

Exemplary Configuration of Base Station

Figure 5:
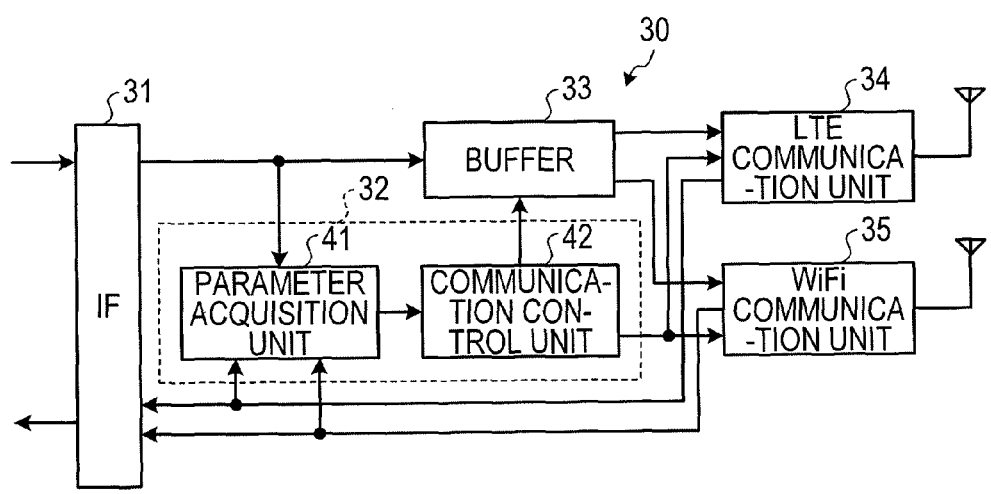
FIG. 5 is a diagram illustrating an example of a base station, according to an embodiment.

FIG. 5 is a diagram illustrating an example of a base station, according to an embodiment. In FIG. 5, the base station 30 includes an interface (IF) 31, a control unit 32, a buffer 33, an LTE communication unit 34, and a WiFi communication unit 35.

The IF 31 is a network interface and transmits and receives signals between the server 10 and the base station 30. For example, the IF 31 receives the signal transmitted from the server 10 and outputs the received signal to the buffer 33 and the control unit 32. For example, a packet to be transmitted to the terminal 70, which is transmitted from the server 10, is output to the buffer 33 and temporarily stored in the buffer 33. Further, for example, the IF 31 transmits the signal received from the LTE communication unit 34 or the WiFi communication unit 35 to the server 10. For example, an ACK signal transmitted from the terminal 70 and received by the LTE communication unit 34 or the WiFi communication unit 35 is transmitted to the server 10 via the IF 31.

The control unit 32 outputs a "communication control signal" to the buffer 33 to control the execution/non-execution of the LA communication, a packet distribution method upon execution of the LA communication, and a communication scheme to be used upon non-execution of the LA communication. Further, here, it is assumed that the LA communication is executed.

Further, the control unit 32 estimates the above-described "first transmission rate" and "second transmission rate". As described above, the first transmission rate is a transmission rate obtained by the communication between the server 10 and the terminal 70 in a case where the "order alignment process" is executed in the layer (here, the LA layer) lower than the transport layer in the terminal 70 which is the reception side apparatus. Further, as described above, the second transmission rate is a transmission rate obtained by the communication between the server 10 and the terminal 70 in a case where the order alignment process is not executed. The control unit 32 controls the execution/non-execution of the order alignment process in the terminal 70 which is the reception side apparatus, based on a magnitude relationship between the estimated first transmission rate and the estimated second transmission rate.

As described in FIG. 5, the control unit 32 includes, for example, a parameter acquisition unit 41, and a communication control unit 42.

The parameter acquisition unit 41 acquires a "first parameter" used for specifying a congestion control algorithm of the server 10 which is the transmission side apparatus, a "second parameter" used for estimating the first transmission rate, and a "third parameter" used for estimating the second transmission rate. The parameter acquisition unit 41 outputs the acquired parameter to the communication control unit 42.

(Regarding the First Parameter)
(First Acquisition Method) Further, the parameter acquisition unit 41 may acquire an IP address of the server 10 as a first parameter. The IP address of the server 10 is acquired by extracting a source IP address of a connection establishment request (Syn) or an establishment acknowledgement (Syn Ack) directed from the server 10 to the terminal in a three way handshaking sequence. For example, the acquisition method for the first parameter is utilized in a case where information on an OS (Operating System) associated with an IP address is registered by a user and in a case where information on the OS associated with an IP address has been obtained in the past.

(Second Acquisition Method) Further, the parameter acquisition unit 41 may monitor the communication between the server 10 and the terminal 70 to acquire information on the OS of the transmission side apparatus from Server element of Response with respect to Get Message as the first parameter. This acquisition method for the first parameter is utilized in a case where a protocol of an upper layer (that is, an upper level protocol) of the transport layer is HTTP. Further, this acquisition method for the first parameter may be utilized in a case where the specifying unit 45 fails to specify information on the OS by using the IP address of the server 10.

(Third Acquisition Method) Further, the parameter acquisition unit 41 may acquire a packet transmission pattern of the server 10 which is the transmission side apparatus when the order alignment process is not performed in the terminal 70 which is the reception side apparatus as the first parameter. This acquisition method for the first parameter may be utilized in a case where the information on the OS has not been registered by a user and the HTTP is not utilized as the upper level protocol.

(Fourth Acquisition Method) Further, the parameter acquisition unit 41 sets a TCP connection from the base station 30 to the server 10 and simulates a transmission behavior of the terminal 70 in which the order alignment process is not performed. Then, the parameter acquisition unit 41 may acquire the packet transmission pattern of the server 10 with respect to the simulation of the transmission behavior of the terminal 70 as the first parameter. This acquisition method for the first parameter may be utilized in a case where the information of the OS has not been registered by a user and the HTTP is not utilized as the upper level protocol.

(Second Parameter)
The parameter acquisition unit 41 acquires information on an effective rate in each link used in the LA as the second parameter for each terminal 70 in advance. Further, information on the effective rate in each link used in the LA is also used as the third parameter.

Further, the parameter acquisition unit 41 acquires a round trip time (RTT) between the server 10 and the terminal 70 as the second parameter. For example, the parameter acquisition unit 41 acquires the RTT based on a time difference between a reception timing of the connection establishment request (Syn) and a reception timing of the acknowledgement (Ack) thereof in the three way handshaking sequence. Further, the RTT is also used as the third parameter.

Further, the parameter acquisition unit 41 acquires a maximum window size (max window size) as the second parameter. For example, the parameter acquisition unit 41 extracts a window scale option information from a connection establishment request (Syn) or an establishment acknowledgement (Syn Ack) directed from the terminal 70 to the server 10 in the three way handshaking sequence. Then, the parameter acquisition unit 41 calculates the max window size, based on the extracted window scale option information.

(Third Parameter)
The parameter acquisition unit 41 acquires a maximum segment size (MSS) in the TCP connection as the third parameter. For example, the parameter acquisition unit 41 acquires information on the MSS from the establishment acknowledgement (Syn Ack) in the three way handshaking sequence.

Further, the parameter acquisition unit 41 acquires information on the delay time difference distribution between links used in the LA as the third parameter in advance.

The communication control unit 42 estimates the first transmission rate and the second transmission rate described above based on the parameters received from the parameter acquisition unit 41. The communication control unit 42 controls the execution/non-execution of the order alignment process in the LA layer in the terminal 70 which is the reception side apparatus, based on the magnitude relationship between the estimated first transmission rate and the estimated second transmission rate.

Figure 6:
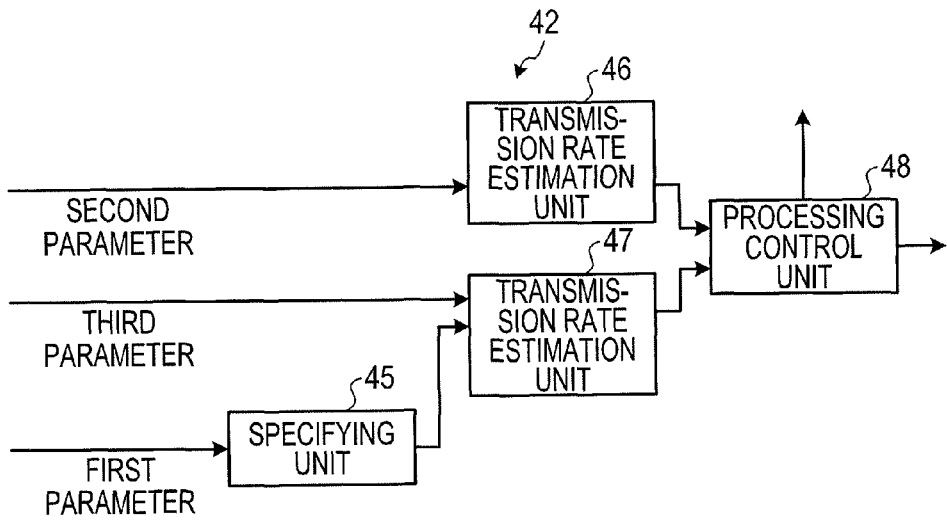
FIG. 6 is a diagram illustrating an example of a configuration of a communication control unit, according to an embodiment.

FIG. 6 is a diagram illustrating an example of a configuration of a communication control unit, according to an embodiment. As described in FIG. 6, the communication control unit 42 includes a specifying unit 45, transmission rate estimation units 46 and 47, and a processing control unit 48. Hereinafter, the transmission rate estimation unit 46 and the transmission rate estimation unit 47 will be also referred to as a "first transmission rate estimation unit" and a "second transmission rate estimation unit", respectively.

The specifying unit 45 specifies a congestion control algorithm applied to the transport layer of the server 10 which is the transmission side apparatus, based on the first parameter received from the parameter acquisition unit 41.

For example, the specifying unit 45 holds an "address/OS table" which stores identification information identifying an OS applied to a device in association with each of a plurality of IP addresses. Further, the specifying unit holds an "OS/algorithm table" in which a congestion control algorithm is associated with each of plural pieces of identification information identifying a plurality of OSs.

Upon receiving an IP address as the first parameter, the specifying unit 45 searches the "address/OS table" for the identification information of an OS associated with the received IP address.

As a search result, when the identification information of the OS associated with the received IP address is found, the specifying unit 45 searches the "OS/algorithm table" for identification information identifying a congestion control algorithm associated with the identification information of the OS. Further, as the search result, when the identification information of the OS associated with the received IP address is not found, the specifying unit 45 may specify the identification information of the OS, based on the first parameter acquired by the second to fourth acquisition methods described above.

Thereafter, as the search result, the specifying unit 45 outputs the identification information of the congestion control algorithm associated with the identification information of the OS to the transmission rate estimation unit 47. Further, as the retrieval result, when the identification information of the congestion control algorithm associated with the identification information of the OS is not found, the specifying unit 45 may output a notification indicating that the algorithm is unknown, to the transmission rate estimation unit 47.

The transmission rate estimation unit 46 estimates the first transmission rate described above, based on the second parameter received from the parameter acquisition unit 41. For example, the transmission rate estimation unit 46 estimates the first transmission rate described above, based on a total effective rate of respective links used in the LA. However, an upper limit value is set for the first transmission rate.

Figure 7:
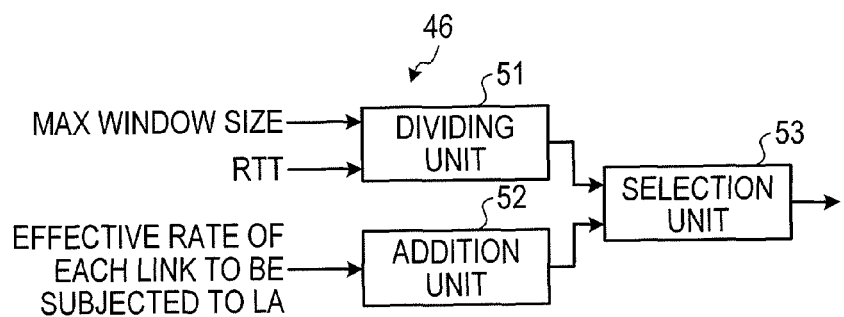
FIG. 7 is a diagram illustrating an example of a configuration of a first transmission rate estimation unit, according to an embodiment.

FIG. 7 is a diagram illustrating an example of a configuration of a first transmission rate estimation unit, according to an embodiment. In FIG. 7, the transmission rate estimation unit 46 includes a dividing unit 51, an addition unit 52, and a selection unit 53.

The addition unit 52 adds the effective rates in the respective links used for the LA to calculate the total of the effective rates (hereinafter, may also be referred to as a "total rate") and outputs the calculated total rate to the selection unit 53.

The dividing unit 51 divides the max window size of TCP by the RTT and outputs a division result (here, quotient value) to the selection unit 53.

The selection unit 53 compares a value of the total rate received from the addition unit 52 with a value of the division result received from the dividing unit 51, and outputs smaller one of the two values as the first transmission rate. That is, the division result in the dividing unit 51 is used as the upper limit value as described above.

The transmission rate estimation unit 47 estimates the second transmission rate, based on the third parameter received from the parameter acquisition unit 41 and the information received from the specifying unit 45. For example, the transmission rate estimation unit 47 estimates the second transmission rate, based on the effective rate in each link used in the LA, the RTT (Round trip time), the MSS, the delay time difference distribution between the respective links used in the LA, and the identification information of the congestion control algorithm. That is, the transmission rate estimation unit 47 estimates the second transmission rate, based on an estimation function associated with the identification information of the congestion control algorithm and the input parameters other than the identification information of the congestion control algorithm.

Figure 8:
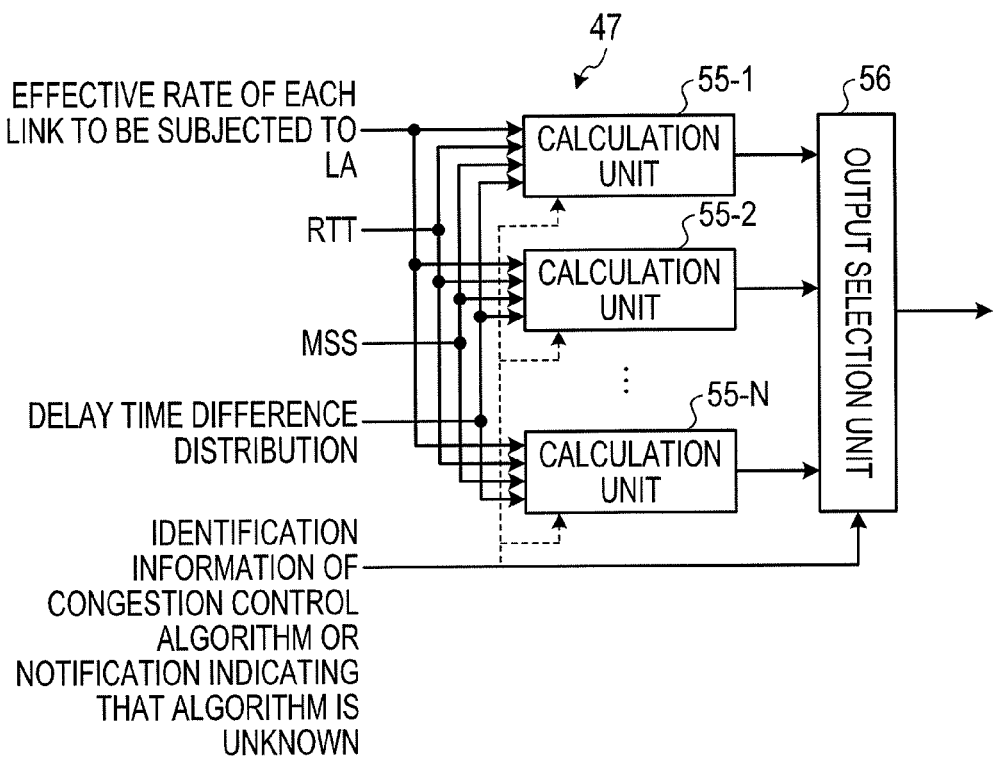
FIG. 8 is a diagram illustrating an example of a configuration of a second transmission rate estimation unit, according to an embodiment.

FIG. 8 is a diagram illustrating an example of a configuration of a second transmission rate estimation unit, according to an embodiment. In FIG. 8, the transmission rate estimation unit 47 includes N (N is a natural number) calculation units 55-1 to 55-N, and an output selection unit 56. When N is 2 (two) or more, the calculation units 55-1 to 55-N respectively correspond to estimation functions of the second transmission rate associated with different congestion control algorithms or estimation functions of the second transmission rate for unknown congestion control algorithms. Hereinafter, descriptions will be made on the assumption that N is 3 (three). Further, hereinafter, it is assumed that the calculation unit 55-1 corresponds to an estimation function A associated with a congestion control algorithm A, the calculation unit 55-2 corresponds to an estimation function B associated with a congestion control algorithm B, and the calculation unit 55-3 corresponds to an estimation function C associated with the unknown congestion control algorithm. Further, the congestion control algorithm A is assumed to be an algorithm associated with Windows (registered trademark) and the congestion control algorithm B is assumed to be an algorithm associated with Linux (registered trademark).

The calculation unit 55-1 is provided with the estimation function A associated with the congestion control algorithm A and calculates the second transmission rate using the estimation function A and the input parameters.

The calculation unit 55-2 is provided with the estimation function B associated with the congestion control algorithm B and calculates the second transmission rate using the estimation function B and the input parameters.

The calculation unit 55-3 is provided with the estimation function C associated with the unknown congestion control algorithm and calculates the second transmission rate using the estimation function C and the input parameters.

The output selection unit 56 outputs the second transmission rate that has been calculated by the calculation unit 55 corresponding to the input identification information of the congestion control algorithm. Further, when the notification indicating that the algorithm is unknown is received, the output selection unit 56 outputs the second transmission rate that has been calculated by the calculation unit 55-3.

Further, descriptions has been made under the assumption that all the calculation units 55-1 to 55-3 operate simultaneously, but only the calculation units 55 associated with the identification information of the congestion control algorithms or only the calculation unit 55 associated with the notification indicating that the algorithm is unknown, may operate. The estimation function will be described later in detail.

Referring back to FIG. 6, the processing control unit 48 controls the execution/non-execution of the order alignment process in the terminal 70 which is the reception side apparatus, based on the first transmission rate estimated in the transmission rate estimation unit 46 and the second transmission rate estimated in the transmission rate estimation unit 47.

For example, the processing control unit 48 controls the execution/non-execution of the order alignment process so that the order alignment process is not executed when a difference between the estimated first transmission rate and the estimated second transmission rate is less than a predetermined value, or the estimated second transmission rate is larger than the estimated first transmission rate. For example, in a case where the terminal 70 is configured to execute the order alignment process in the LA layer of the terminal 70 under the condition that the control signal instructing the terminal 70 to execute the order alignment process is received by the LA layer of the terminal 70, it is unnecessary for the processing control unit 48 to perform the processing therefor. Otherwise, the processing control unit 48 may generate a control signal which instructs the terminal 70 not to execute the order alignment process and transmit the control signal to the terminal 70 through the LTE communication unit 34 or the WiFi communication unit 35.

In the meantime, the processing control unit 48 controls the execution/non-execution of the order alignment process so that the order alignment process is executed when the estimated second transmission rate is less than the estimated first transmission rate and the difference described above is a predetermined value or more. For example, the processing control unit 48 generates the control signal which instructs the terminal 70 to execute the order alignment process and transmits the control signal to the terminal 70 through the LTE communication unit 34 or the WiFi communication unit 35. Further, in a case where the terminal 70 is not equipped with the functionality of the order alignment process, the communication control unit 42 may issue an instruction that requests the buffer 33 not to execute the LA communication.

Example of Operations of Communication System

Figure 9:
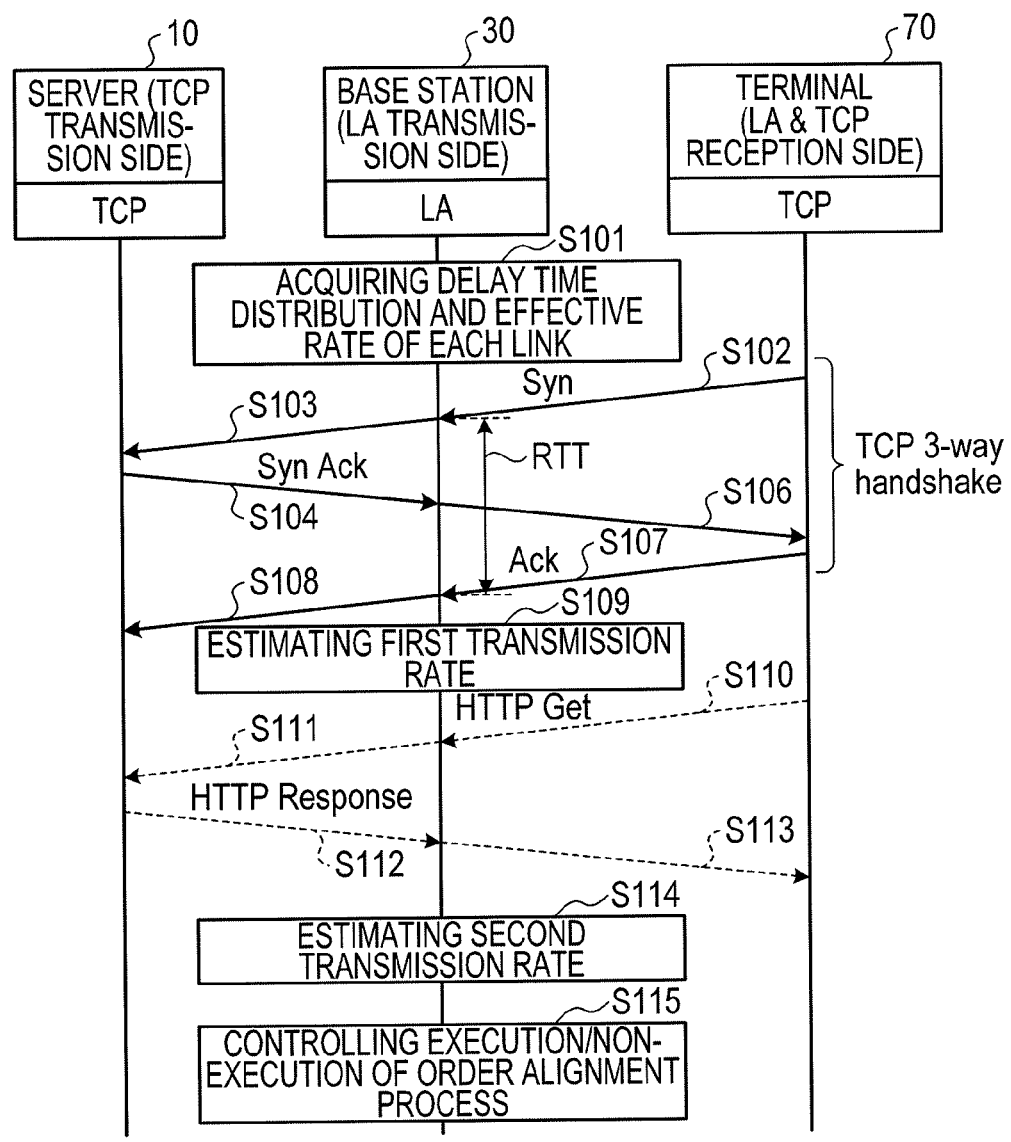
FIG. 9 is a diagram illustrating an example of an operational sequence for a communication system, according to an embodiment.
Figure 10:
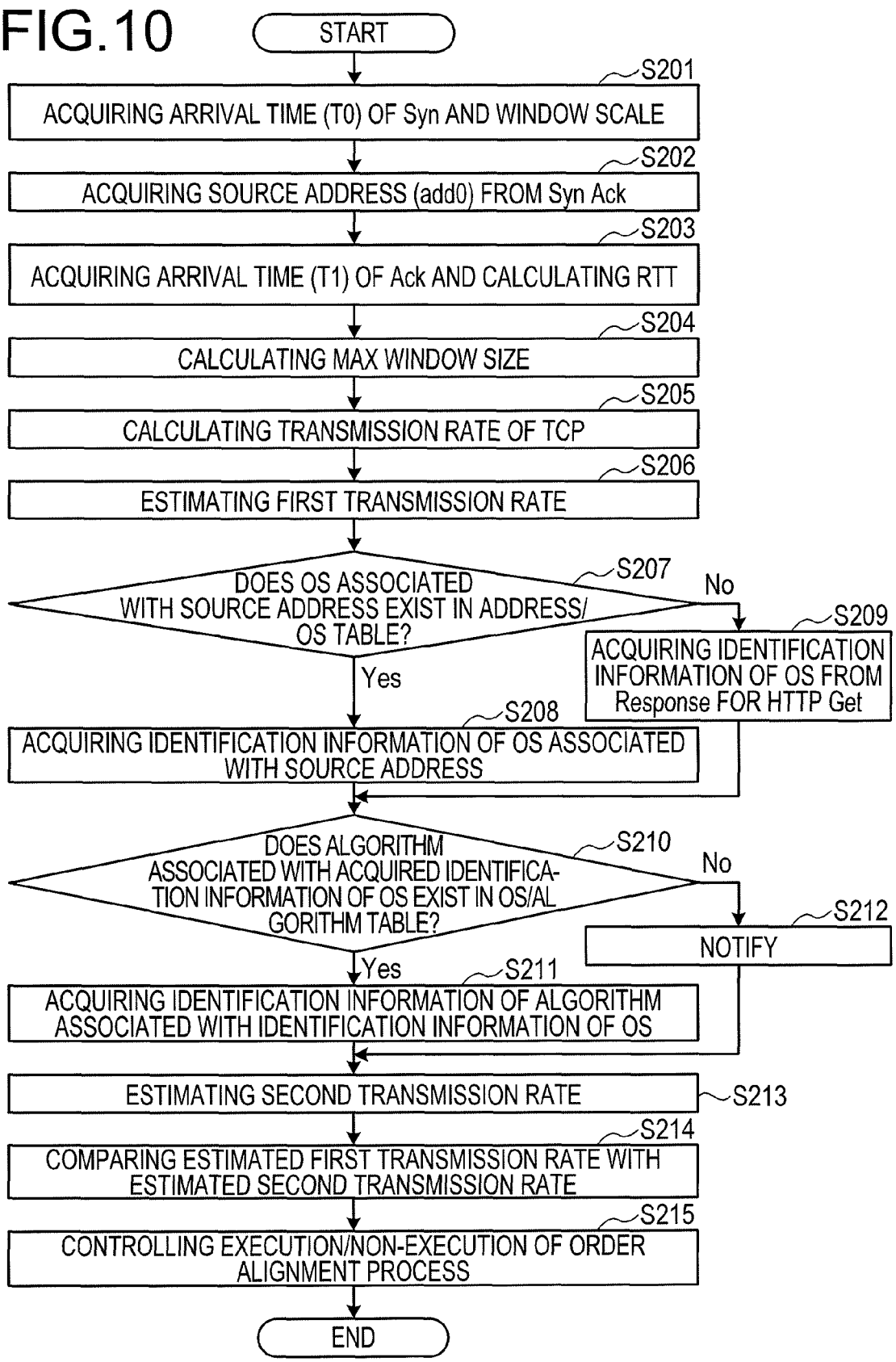
FIG. 10 is a diagram illustrating an example of an operational flowchart for a base station, according to an embodiment.

Descriptions will be given of an example of processing operations of the communication system 1 having the configuration described above. FIG. 9 is a diagram illustrating an example of an operational sequence for a communication system, according to an embodiment. FIG. 10 is a diagram illustrating an example of an operational flowchart for a base station, according to an embodiment.

The control unit 32 of the base station 30 acquires a delay time distribution of links used for the LA and the effective rate of each link, for each terminal 70 (step S101).

The terminal 70 transmits the establishment request (Syn) addressed to the server 10 to the base station 30 in the three way handshaking sequence (step S102). Here, the control unit 32 of the base station 30 acquires an arrival time T0 of the received Syn and acquires information on the window scale from the received Syn (step S201).

The base station 30 transmits the received Syn to the server 10 (step S103).

The server 10 transmits the establishment acknowledgement (Syn Ack) responsive to the Syn, to the base station 30 (step S104). Here, the control unit 32 of the base station 30 acquires a source address (that is, transmission source address "add0") from the received Syn Ack (step S202).

The base station 30 transmits the received Syn Ack to the terminal 70 (step S106).

The terminal 70 transmits the acknowledgement (Ack) responsive to the Syn Ack to the base station 30 (step 107). Here, upon receiving the Ack, the control unit 32 of the base station 30 acquires the arrival time T1 of the Ack and calculates an RTT (i.e., T1−T0) by subtracting T0 from T1 (step S203). Also, the control unit 32 calculates the max window size by using a value of the window scale acquired at step S201 (step S204). Also, the control unit 32 calculates the transmission rate of TCP by dividing the max window size calculated at step S204 by the RTT calculated at step S203 (step S205). The calculated transmission rate of TCP corresponds to the upper limit value described above.

The base station 30 transmits the received Ack to the server 10 (step S108).

The control unit 32 of the base station 30 estimates (calculates) the first transmission rate described above (step S109 and step S206). Also, the control unit 32 determines whether an OS associated with the source address acquired at step S202 exists in an address/OS table (step S207). When it is determined that the OS exists ("YES" at step S207), the control unit 32 acquires the identification information of the OS associated with the source address acquired at step S202 (step S208). FIG. 11 is a diagram illustrating an example of an address/OS table, according to an embodiment. For example, when the source address is "xxxx", the control unit 32 acquires the OS identification information (that is, "win") associated with the address of "xxxx". In the case, the OS identification information of "win" is assumed to be the identification information associated with Windows (registered trademark) and the identification information of "linux" is assumed to be identification information associated with Linux (registered trademark). Further, when it is determined that the OS does not exist ("NO" at step S207), the control unit 32 acquires the OS identification information of the server 10 from HTTP Response transmitted from the server 10 to the base station 30 at step S112 (step S209). Here, the HTTP Response is a response signal responsive to the HTTP Get that is transmitted from the terminal 70 through the base station 30 to the server 10 at step S110 and step S111. The base station 30 transmits the received HTTP Response to the terminal 70 (step S113). Further, the information contained in the address/OS table may be fixed or varied. When the information varies, the address/OS table may be updated sequentially with the newly acquired information.

The control unit 32 determines whether an algorithm associated with the identification information of the OS acquired at step S208 or step S209 exists in the OS/algorithm table (step S210). When it is determined that the algorithm exists ("YES" at step S210), the control unit 32 acquires the identification information of the algorithm associated with the identification information of the OS acquired at step S208 or step S209 (step S211). FIG. 12 is a diagram illustrating an example of an OS/algorithm table, according to an embodiment. For example, when the acquired OS identification information is the "win", the control unit 32 acquires the identification information A of the congestion control algorithm associated with the "win". Further, when it is determined that the algorithm does not exist ("NO" at step S210), the control unit 32 provides a notification (corresponding to the notification indicating that the algorithm is unknown) within the control unit 32 (step S212). Further, even when the OS identification information was not obtained from the Response at step S209, the notification (corresponding to the notification indicating that the algorithm is unknown) may be provided within the control unit 32.

The control unit 32 estimates (calculates) the second transmission rate described above (step S114 and step S213). The control unit 32 compares the estimated first transmission rate with the estimated second transmission rate (step S214) and controls the execution/non-execution of the order alignment process according to the comparison result (step S115 and step S215).

Derivation Method of Estimation Function

An estimation function associated with the congestion control algorithm of TCP may be derived by embedding each of congestion control algorithms and analyzing the behavior of each congestion window according to the embedded one of the congestion control algorithms, in a steady state when the order of received packets is reversed.

(Estimation Function B Associated with Linux (Registered Trademark))

Figure 13:
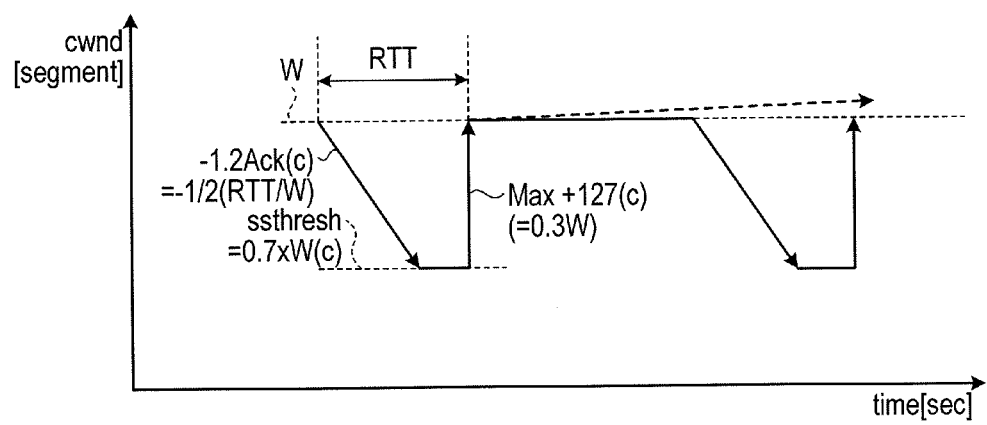
FIG. 13 is a diagram illustrating an example of a behavior of a congestion window by a congestion control algorithm of Linux (registered trademark), according to an embodiment.

For example, a congestion control algorithm (that is, TCP rate control algorithm) embedded in the Linux (registered trademark) OS ver.3.0.0 will be exemplified. FIG. 13 is a diagram illustrating an example of a behavior of a congestion window by a congestion control algorithm of Linux (registered trademark), according to an embodiment.

In the case of the TCP rate control algorithm, when the order of received packets whose number exceeds a value indicated by a reordering parameter is reversed, re-transmission of packets occurs.

When packets are re-transmitted, the congestion window is shifted to a recovery state and a rate-halving process is performed. That is, in the rate-halving process, each time two acknowledgements (Ack) are received, a congestion window ("cwnd") value is decreased by one TCP segment. However, decreasing of the "cwnd" value is stopped when the "cwnd" value reaches seven-tenths of the cwnd value at the time when the packet retransmission is started.

Figure 3:
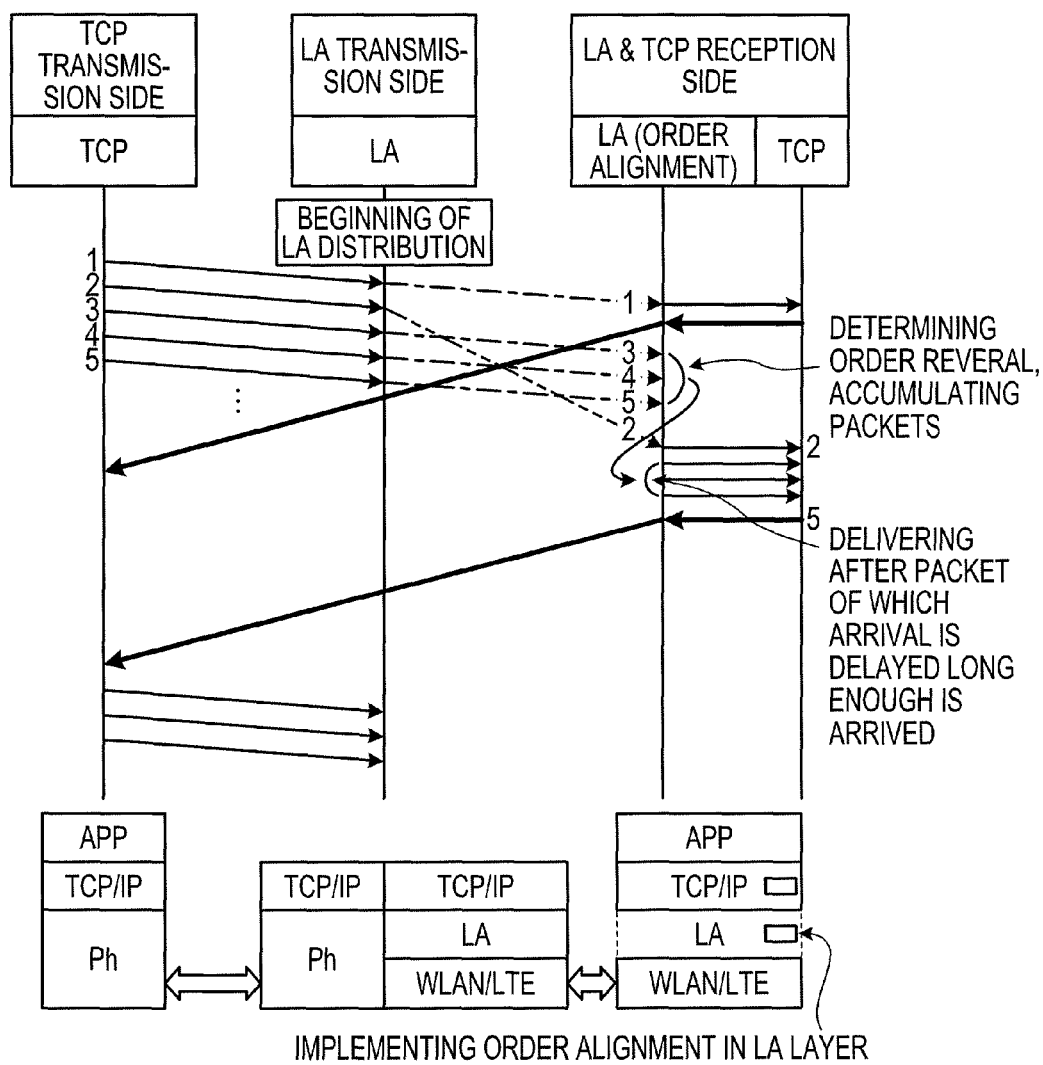
FIG. 3 is a diagram illustrating an example of an order alignment process.

Further, the recovery state is ended at the time when Acks for packets that have been transmitted before retransmitting the packets are received and the packets that have been transmitted by that time are acknowledged, and the congestion window is returned to a normal transmission state. When it is recognized that an occurrence of the packet retransmission is caused by the reversal of the order during the recovery state, a reordering parameter is corrected with a maximum value (127 at maximum) of the number of packets recognized as being reverse ordered and the "cwnd" value is recovered to the value at the time before the packet retransmission is started (F-RTO Recovery). However, when a difference between the "cwnd" value at the time when the recovery state is ended and the "cwnd" value at the time before the packet retransmission is started is larger than or equal to the value of the reordering parameter, the cwnd value is increased, from the "cwnd" value at the time when the recovery state is ended, only by the value of the reordering parameter. Further, in the normal transmission state, the "cwnd" value increases according to an increase formula in a congestion avoidance phase of the TCP rate control algorithm. However, when the order of packets whose number exceeds the value of the reordering parameter is newly reversed, the congestion window is shifted to the recovery state. Finally, at the time when the reordering parameter reaches 127 which is the maximum value, the behavior of "cwnd" value enters into a stable state. When the behavior of "cwnd" value enters into the stable state, "cubic", which is a rate control algorithm used normally in the Linux (registered trademark) OS, hardly increases the "cwnd" value in the normal transmission state (see the arrow drawn with dotted lines of FIG. 3). That is, an increase rate of the "cwnd" value is extremely low.

Analyzing the behavior of the "cwnd" value described above allows an average value W- of the "cwnd" to be calculated. When the average value W- of the "cwnd" is calculated, the second transmission rate may be calculated by the following Equation (1).

$$\text{second transmission rate} = W^- \times \text{MSS} / \text{RTT} \quad (1)$$

Figure 14:
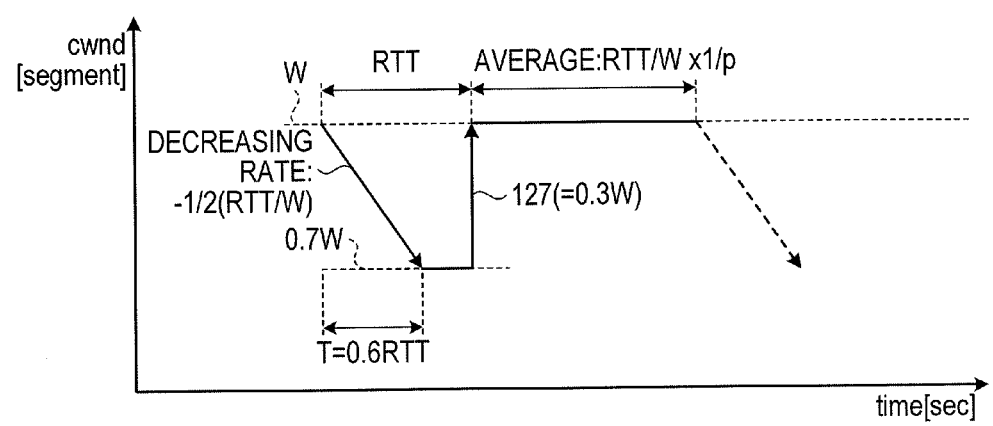
FIG. 14 is a diagram illustrating an example of calculation of an average value of a congestion window, according to an embodiment.

FIG. 14 is a diagram illustrating an example of calculation of an average value of a congestion window, according to an embodiment.

In FIG. 14, W is a cwnd value at the start of a recovery state, and 0.3W=127 is established. Accordingly, W=127/0.3 is established.

Further, when it is assumed that a time taken until the "cwnd" value reaches a lower limit value (ssthresh) in the recovery state is "T", T/{2 (RTT/W)}=0.3W is established. Accordingly, T=0.6 RTT is established.

Further, it is assumed that the probability of the retransmission occurrence due to the reversal of the packet order, that is, the probability where the order of 127 packets is reversed is a probability p. Since a time difference caused by 127 packets is expressed as 127 RTT/W (that is, 0.3 RTT), the probability p may be represented by the following Equation (2).

$$p = (\text{probability of transmitting packet to LTE}) \times ((\text{probability of transmitting packet to } WLAN) \times f(0.3\text{RTT}) \quad (2)$$

Figures 15, 16:
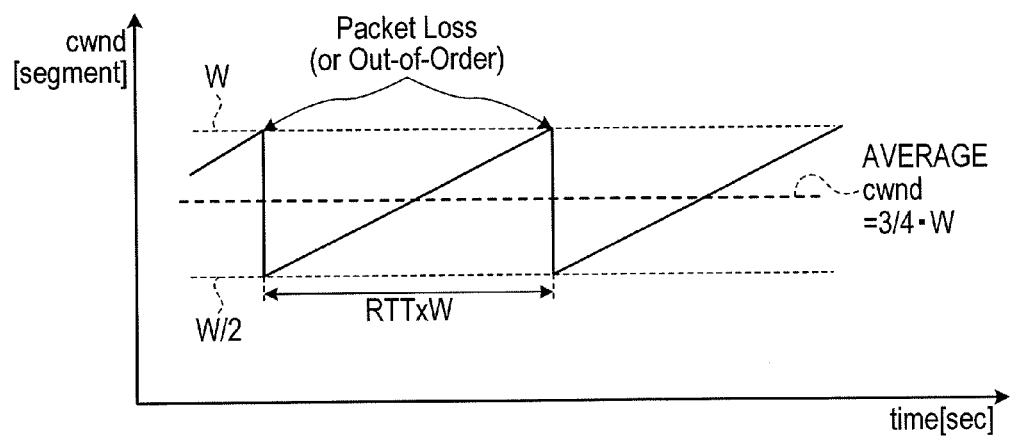
FIG. 15 is a diagram illustrating an example of a table corresponding to delay time difference distribution, according to an embodiment.
FIG. 16 is a diagram illustrating the behavior of the congestion window by a congestion control algorithm of Windows (registered trademark), according to an embodiment.

Here, f(x) is a probability that a delay time difference in the packet transmission between links becomes "x" or more. FIG. 15 is a diagram illustrating an example of a table corresponding to delay time difference distribution, according to an embodiment.

Also, when the "cwnd" value demonstrates the behavior illustrated in FIG. 14, an average value W- of the "cwnd" may be represented by the following Equation (3).

$$W^- = \{W \times \text{RTT} - (1+0.4)\text{RTT} \times 0.3 W/2 + \text{RTT}/W \times 1/p \times W\} / (\text{RTT} + \text{RTT}/W \times 1/p) \quad (3)$$

When the right side of Equation (3) is divided by RTT, Equation (3) is reduced to the following Equation (4).

$$W^- = (0.79W + 1/p) / \{1 + 1/(Wp)\} \quad (4)$$

By substituting W=127/0.3 into Equation (4), Equation (4) is reduced to the following Equation (5).

$$W^- = (100.33p + 0.3)/(0.3p + 0.09/127) \quad (5)$$

By substituting $W^-$ obtained by Equation (5) into Equation (1), the second transmission rate may be calculated.

Next, description will be given of an example of calculating the second transmission rate using Equation (5). In the example, the calculation is subject to the following conditions. It is assumed that a principal cause of the delay time difference is a HARQ retransmission of the LTE. Further, it is assumed that an error rate in the first transmission of the LTE is "0.1". Further, it is assumed that a gain at the time of HARQ retransmission of the LTE is "0.5". Further, a retransmission overhead is assumed as 8 [msec]. Further, a fixed delay is assumed to be 5 [msec]. Further, the delay in the WLAN is assumed to be 2 [msec].

Then, the probability f(x) that the delay time difference becomes "x" [sec] or more may be represented by the following Equation (6).

$$f(x) = 1(0.000 < x < 0.003), \ 0.1(0.003 < x < 0.011), \ 0.005 \\ (0.011 < x < 0.017), \ 0.000125(0.017 < x < 0.025), \ \ldots, \ 0.1^n \times 0.5^{n(n-1)/2}(0.003 + 0.008(n-1) < x < 0.003 + 0.008n; n = 0 \sim 5) \quad (6)$$

When it is assumed that RTT=15 [msec], f (0.3 RTT) equals to f (0.0445). Also, when using Equation (6), f (0.0445) becomes 0.1 (n=1).

Here, since a probability of transmitting packet to LTE and a probability of transmitting packet to WEAN contribute to making the transmission rate smaller and thus, the probabilities are assumed to be negligible. Then, p=0.1 is established from Equation (2).

When p=0.1 is substituted into Equation (5), $W^-$ is obtained.

$$W^- = (100.33 \times 0.1 + 0.3)/(0.3 \times 0.1 + 0.09/127) = 336.48487$$

Then, the second transmission rate is calculated by substituting the above value into Equation (1). The second transmission rate is equal to 269 [Mbps].

(Estimation Function A Associated with Windows (registered trademark))

FIG. 16 is a diagram illustrating the behavior of the congestion window by a congestion control algorithm of Windows (registered trademark), according to an embodiment.

In the congestion control algorithm (that is, TCP rate control algorithm) described above, when it is detected that the order of 3 (three) packets is reversed, the packets are re-transmitted. When the packets are re-transmitted, the "cwnd" value is halved. Thereafter, the "cwnd" value is increased by 1 TCP segment each time the Ack is received.

By analyzing the behavior of the "cwnd" value, an average value of the "cwnd" (that is, average cwnd) may be calculated. That is, the average cwnd=3W/4.

A loss occurrence interval, that is, a time taken until the "cwnd" value is recovered to W from W/2 is RTT×W (that is, W/2×(1/2RTT)).

Therefore, the number of packets transmitted during a time period between the occurrence of losses is $3W^2/4$ (that is, average cwnd/RTT×(RTT×W)).

Therefore, a loss occurrence probability p is represented by the following Equation (7).

$$p = 1/(3W^2/4) \quad (7)$$

By solving Equation (7) with a max window size W, the max window size W is represented by the following Equation (8).

$$W = 2/(3p)^{1/2} \quad (8)$$

Further, the average rate R is represented by the following Equation (9).

$$R = \text{average cwnd/RTT} \quad (9)$$

Accordingly, R is represented by the following Equation (10) using Equation (9) and Equation (8).

$$R = 3W/4/\text{RTT} = (3/p)^{1/2}/2\text{RTT} \quad (10)$$

Further, the loss occurrence probability p (that is, a packet loss ratio) is regarded as a probability that reversal of the order of packets occurs at a packet three packets before. Also, an interval between three packets is 3/R [sec].

Further, when it is assumed that a probability that a difference in the packet transmission delay time between links is "x" or more is the probability f(x), a loss occurrence probability p may also be represented by the following Equation (11).

$$p = f(3/R) \quad (11)$$

Further, the probability f(x) may be represented by the following Equation (12).

$$f(x) = 0.1^n \times 0.5^{n(n-1)/2}(0.003 + 0.008(n-1) < x < 0.003 + 0.008n; n = 0 \text{ to } 5) \quad (12)$$

R may be obtained by using simultaneous equations of Equation (10) and Equation (11).

Figure 17:
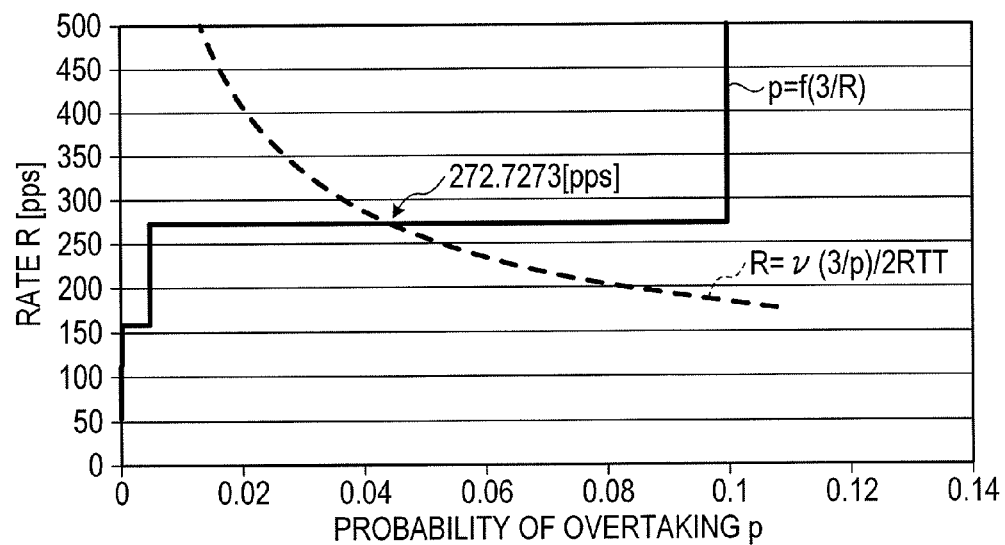
FIG. 17 is a diagram illustrating an example of a calculation method for an average rate, according to an embodiment.

FIG. 17 is a diagram illustrating an example of a calculation method for an average rate, according to an embodiment. That is, as illustrated in FIG. 17, R may be obtained by obtaining an intersection point of a curve of Equation (10) with a curve of Equation (11).

In the case, the second transmission rate may be represented by the following Equation (13).

$$\text{second transmission rate} = R \times \text{MSS [bps]} \quad (13)$$

Accordingly, when R obtained by the simultaneous equations is substituted into Equation (13), the second transmission rate is calculated.

For example, when RTT is 15 [msec] and MSS is 1500 [byte], R is 272.7273 [pps] which is equal to 3.3 [Mbps] (that is, R=272.7273 [pps]=3.3 [Mbps]).

(Estimation Function C for a Case where Algorithm is Unknown)

In a case where a congestion control algorithm is normally embedded, when three Dup Acks are received in the transmission side apparatus, the packet retransmission and the rate reduction occur. In other words, when the reversal of the order is resolved before transmitting three Dup Acks, the reduction of TCP rate does not occur.

For example, in a case where the delay time difference between links is 11 [msec] (in a case of 99.5% of maximum value), when three packets are not transmitted during 11 [msec], no packet may be overtaken by three packets.

Accordingly, a transmission rate which satisfies a condition that a packet length is 1500 [byte] and "three packets are not transmitted during 11 [msec]" is required to be less than or equal to 3.3 [Mbit/sec] (that is, 1500 byte×3/11 msec). When a total execution rate of all the links is less than or equal to 3.3 [Mbit/sec], an order control becomes unnecessary for all of the congestion control algorithms.

When it is generalized, the second transmission rate may be represented by the following Equation (14).

$$\text{second transmission rate} = \text{MSS} \times 3/x \quad (14)$$

where "x" is a maximum delay difference [sec] between links.

As described above, according to the embodiment, the processing control unit 48 of the base station 30 controls the execution/non-execution of the order alignment process in the terminal 70, based on the magnitude relationship between the first transmission rate estimated in the transmission rate estimation unit 46 and the second transmission rate estimated in the transmission rate estimation unit 47.

With this configuration of the base station 30, since the order alignment process in the terminal 70 is not be executed when the magnitude relationship between the first transmission rate and the second transmission rate satisfies a predetermined condition, the processing load of the terminal 70 may be reduced.

For example, the processing control unit 48 controls the execution/non-execution of the order alignment process so that the order alignment process is not executed in a case where a difference between the estimated first transmission rate and the estimated second transmission rate is less than a predetermined value or the estimated second transmission rate is larger than the estimated first transmission rate. For example, it is unnecessary for the processing control unit 48 to perform the order alignment process in a case where the LA layer of the terminal 70 is configured to execute the order alignment process upon receiving a control signal instructing the terminal 70 to execute the order alignment process. Further, the processing control unit 48 may generate the control signal which instructs the terminal 70 not to execute the order alignment process and transmit the control signal to the terminal 70 through the LTE communication unit 34 or the WiFi communication unit 35.

Further, the processing control unit 48 controls the execution/non-execution of the order alignment process so that the order alignment process is executed in a case where the estimated second transmission rate is less than the estimated first transmission rate and the difference is a predetermined value or more. For example, the processing control unit 48 generates the control signal which instructs the terminal 70 to execute the order alignment process and transmits the control signal to the terminal 70 through the LTE communication unit 34 or the WiFi communication unit 35.

Further, the transmission rate estimation unit 47 of the base station 30 estimates a second transmission rate based on a third parameter. The third parameter includes the effective rate of each link used in the LA, the RTT between the server 10 and the terminal 70, and information on the congestion control algorithm used in the transport layer of the server 10. Further, the third parameter includes the delay time difference distribution between respective links and the maximum segment size in the transport layer of the server 10.

With this configuration of the base station 30, the transmission rate for a case where the order alignment process is not executed may be estimated based on the type of the congestion control algorithm.

Further, the specifying unit 45 of the base station 30 specifies the congestion control algorithm, based on the information relating to the OS of the server 10.

With this configuration of the base station 30, the congestion control algorithm may be easily specified.

Further, the transmission rate estimation unit 46 of the base station 30 estimates the first transmission rate described above, based on the total effective rates of respective links used in the LA.

With this configuration of the base station 30, a transmission rate for a case where the order alignment process is executed may be estimated.

Other Embodiments

[1] Functionalities of the control unit 32 of the base station 30 of Embodiment 1 may be implemented by a separate device (e.g., a control device) independent from the base station 30.

[2] In Embodiment 1, the packet transmission in the downstream link is described as an example, but the embodiment is not limited thereto. That is, the technology described in Embodiment 1 may also be applied to an upstream link. In a case of an upstream link, the order alignment process is performed in the base station 30. Further, in the case of an upstream link, information relating to the window scale is acquired (extracted) from the Syn Ack and a source address is acquired from the Syn.

[3] In Embodiment 1, the control unit 32 of the base station 30 controls the execution/non-execution of the order alignment process so that the order alignment process is not executed in the terminal 70 in a case where the magnitude relationship between the estimated first transmission rate and the estimated second transmission rate satisfies a predetermined condition, but the embodiment is not limited thereto. For example, the control unit 32 may control the execution/non-execution of the order alignment process so that the LA itself is not executed in a case where the magnitude relationship between the estimated first transmission rate and the estimated second transmission rate satisfies a predetermined condition.

[4] Respective constitutional elements of respective units illustrated in Embodiment 1 are not necessarily configured to be physically the same as those illustrated. That is, a specific shape of distribution and integration of the respective units is not limited to a shape illustrated and all or some of the units may be configured to be functionally and physically distributed or integrated in a certain device according to various loads or use situation.

Further, all or some of various processing functions performed by each device may be executed on a CPU (Central Processing Unit) (or a micro-computer such as MPU (Micro Processing Unit) or MCU (Micro Controller Unit)). Further, all or some of various processing functionalities may also be performed on program interpreted and executed by the CPU (or a micro-computer such as MPU or MCU) or a hardware by a wired-logic.

The base station of the embodiment may be implemented with the following hardware configuration.

Figure 18:
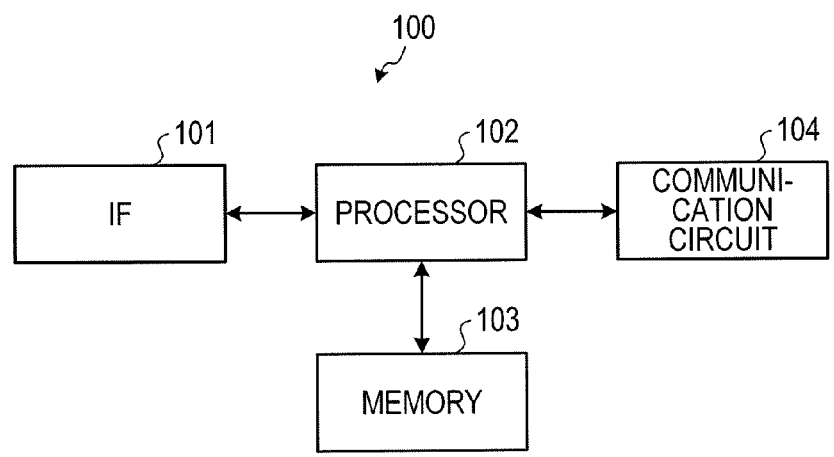
FIG. 18 is a diagram illustrating an example of a hardware configuration of a base station, according to an embodiment.

FIG. 18 is a diagram illustrating an example of a hardware configuration of a base station, according to an embodiment. As described in FIG. 18, a base station 100 includes an IF (InterFace) 101, a processor 102, a memory 103, and a communication circuit 104. Examples of the processor 102 may include, for example, a CPU, a DSP (Digital Signal Processor), and a FPGA (Field Programmable Gate Array). Further, examples of the memory 103 may include a RAM (Random Access Memory) such as a SDRAM (Synchronous Dynamic Random Access Memory), a ROM (Read Only Memory), and a flash memory.

Also, various processing functionalities performed in the base station of Embodiment 1 may be implemented by causing a processor provided in a management device to execute a program stored in various memories such as a non-volatile storage medium.

That is, the program corresponding to each processing executed by the control unit 32 may be recorded in the memory 103 and each program may be executed by the processor 102. Further, the buffer 33 is implemented by the memory 103. Further, the IF 31 is implemented by the IF

101. Further, the LTE communication unit 34 and the WiFi communication unit 35 are implemented by the communication circuit 104.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for controlling a communication in which packets to be transmitted over a transport layer connection established between a transmission side apparatus and a reception side apparatus are distributed to a plurality of links for transmission, the apparatus comprising:
    a hardware processor configured to:
    estimate a first transmission rate obtained by the communication in which an order alignment process is executed in a layer lower than the transport layer in the reception side apparatus, the order alignment process including aligning an order of received packets in accordance with a transmission order,
    estimate a second transmission rate obtained by the communication in which the order alignment process is not executed in the reception side apparatus, and
    control an execution/non-execution of the order alignment process in the reception side apparatus, based on a difference between the first transmission rate and the second transmission rate; and
    a memory coupled to the hardware processor and configured to temporally store the received packets.

2. The apparatus of claim 1, wherein the hardware processor controls the execution/non-execution of the order alignment process such that:
    the order alignment process is not executed when the difference between the first and second transmission rates is less than a predetermined value or the second transmission rate is larger than the first transmission rate, and
    the order alignment process is executed when the second transmission rate is less than the first transmission rate and the difference is a predetermined value or more.

3. The apparatus of claim 1, wherein the hardware processor estimates the second transmission rate, based on information relating to an effective transmission rate of each link, a round trip time between the transmission and reception side apparatuses, a congestion control algorithm utilized in the transport layer of the transmission side apparatus, a delay time difference distribution between respective links, and a maximum segment size in the transport layer of the transmission side apparatus.

4. The apparatus of claim 3, wherein the hardware processor is further configured to specify the congestion control algorithm, based on information relating to an operating system of the transmission side apparatus.

5. The apparatus of claim 1, wherein the hardware processor estimates the first transmission rate, based on a total effective rate of the respective links.

6. A method for controlling a communication in which packets to be transmitted over a transport layer connection established between a transmission side apparatus and a reception side apparatus are distributed to a plurality of links for transmission, the method comprising:
    estimating a first transmission rate obtained by the communication in which an order alignment process is executed in a layer lower than the transport layer in the reception side apparatus, the order alignment process including aligning an order of received packages in accordance with a transmission order;
    estimating a second transmission rate obtained by the communication in which the order alignment process is not executed in the reception side apparatus; and
    controlling an execution/non-execution of the order alignment process in the reception side apparatus, based on a difference between the first transmission rate and second transmission rate.

* * * * *